US006855335B2

(12) United States Patent
Seok et al.

(10) Patent No.: US 6,855,335 B2
(45) Date of Patent: Feb. 15, 2005

(54) PROCESS FOR PREPARING SILICA MICROCAPSULES

(75) Inventors: Sang Il Seok, Daejeon (KR); Bok Yeop Ahn, Daejeon (KR)

(73) Assignees: Unitech Co., Ltd., Gyeonggi-Do (KR); Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 10/679,434

(22) Filed: Oct. 7, 2003

(65) Prior Publication Data

US 2004/0256748 A1 Dec. 23, 2004

(30) Foreign Application Priority Data

Jun. 17, 2003 (KR) ................................ 10-2003-0039176

(51) Int. Cl.[7] .............................. A61K 9/32; B32B 5/16; B01J 13/02
(52) U.S. Cl. ........................ 424/489; 424/491; 424/497; 428/402.21; 428/402.24; 428/403; 428/407; 264/4.1; 264/4.33; 264/4.4; 264/4.7
(58) Field of Search .................................. 424/489, 491, 424/497; 428/402.21, 402.24, 403, 407; 264/4.1, 4.33, 4.4, 4.7

(56) References Cited

FOREIGN PATENT DOCUMENTS

| JP | 11-029318 | 2/1999 |
| JP | 2001-038193 | 2/2001 |

OTHER PUBLICATIONS

Caruso, F. et al., "Production of Hollow Microspheres from Nanostructured Composite Particles", Chem. Mater., vol. 11, No. 11, pp. 3309–3314, (1999).

Schacht, S., et al., "Oil–Water Interface Templating of Mesoporous Macroscale Structures", Science, vol. 273, pp. 768–771, Aug. 9, 1996.

*Primary Examiner*—Samuel A. Acquah
(74) *Attorney, Agent, or Firm*—Finnegan, Henderson, Farabow, Garrett & Dunner, LLP

(57) ABSTRACT

The present invention relates to a process for preparing silica microcapsules and more particularly, to a process for preparing silica microcapsules comprising the steps of dissolving tetraethyl orthosilicate (TEOS) into an aqueous solution containing a hydrolysis catalyst to control a degree of hydrolysis and contribute hydrophilicity or lipophilicity, adding a core material and an appropriate amount of aminopropyltrialkoxysilane(APS) as a gelling agent into the solution, and emulsifying and dispersing the resulting solution to a solution having a polarity opposite to that of the core material to microcapsulate by coating the core material with silica shell via a sol-gel reaction. The process for preparing microcapsules of the present invention reduces environmental pollution compared to conventional processes using an alkali gelling agent such as an ammonia solution, and are suitable for both organic or inorganic core materials having hydrophilic or lipophilic property.

6 Claims, 2 Drawing Sheets

PROCESS FOR PREPARING SILICA MICROCAPSULES

FIELD OF THE INVENTION

The present invention relates to a process for preparing silica microcapsules, and more particularly, to a process for preparing silica microcapsules comprising the steps of dissolving tetraethyl orthosilicate (TEOS) into an aqueous solution containing a hydrolysis catalyst to control a degree of hydrolysis and contribute hydrophilicity or lipophilicity, adding a core material and an appropriate amount of aminopropyltrialkoxysilane(APS) as a gelling agent into the solution, and emulsifying and dispersing the resulting solution to a solution having a polarity opposite to that of the core material to encapsulate the core material with silica shell via a sol-gel reaction. The process for preparing microcapsules of the present invention is more excellent in reducing environmental pollution as compared to conventional processes, which use an alkali gelling agent such as an ammonia solution, and is suitable for organic or inorganic core materials having hydrophilic or lipophilic properties.

BACKGROUND OF THE INVENTION

Microcapsules are small particles that contain a core material or an active material surrounded by a shell or a different matter. Depending on the size of capsule particles they are classified into different categories: e.g., nanocapsules for particles having a size of 1 μm or less, macrocapsules for 1000 μm or more, and microcapsules are those lied in between the two ranges.

Microencapsulation technique has been widely adopted for the purpose of, e.g., protecting a core material or content, shielding or concealing of an unpleasant taste or odor (drugs, foods and the like), controlling the rate of liberation to outside (perfumes, drugs and the like) and changing the phase of a core material for easy handling such as liquid core materials. In the broadest sense, microencapsulation technique is often referred to as a state where two materials are stably separated by surfactants, oil phase dispersed in a polar solvent.

Examples of core materials microencapsulated include adhesives including pressure-sensitive adhesives, agricultural chemicals, live cells, enzymes, perfumes, drugs, inks, and the like. They are intended to be used as medicines, agricultural chemicals, fragrances, pressure-sensitive copying papers and adhesives, and the like with continued release by conferring on a core material by encapsulation functions such as controlled-release, and storage stability. Microencapsulation is especially useful where it is desired to provide controlled release, stability, and safekeeping of core materials.

Particularly, demand for functional cosmetics with improved sun protection factor (SPF) is on rapid increase due to increased concern on minimizing skin damages against UV light. However, when a large amount of a UV absorbing agent is added to improve SPF values, it may cause skin troubles and deteriorate quality of cosmetics. Microcapusulation or nanocapsulation is highly demanded to give satisfaction in utility, stability and safekeeping as well as not causing any skin troubles.

Shell-forming materials encapsulating core materials are mostly organic materials such as polymers or waxes and examples of capsulation techniques, which have polymerization of monomers at the surface of two different polarities, include interfacial polymerization, in-situ polymerization, phase separation, in-liquid drying, spray drying in fluidized bed, and the like, which have been developed as drug delivery systems. Since the polymer shell materials have poor properties in chemical stability, heat resistance and strength, their usages are often limited depending on their intended purposes. It is not also preferred to control the releasing rate due to difficulty in manufacturing porous shells. The present invention uses silica, a natural inorganic material, to encapsulate a core material to improve such drawbacks associated with the use of polymer shell materials.

Many processes for preparing hollow silica capsules have been reported. F. Caruso and co-workers describe a process for burning inner polymer after silica is coated electrostatically on the surface of polymer microspheres which are dispersed into a medium [Chem. Mater., 11, 3309 (1999)]. S. Schacht et al. disclose a process for burning inner surfactant after depositing anionic silica on the surface of O/W type micelles prepared with cationic surfactant [Science, 273, 768(1996)]. Hollow silica particles are dispersed into a solvent in which an organic material is dissolved to encapsulate an organic core material using microspheres prepared by this meth7od. The silica capsules are again coated on the external surface with polymers to control the rate of release.

Further, JP Patent Publication Nos. Pyung 13-38193 and 11-29318 disclosed a method for preparing spherical silica microcapsules encapsulating a core material by employing oil-in-water system containing tetraethyl orthosilicate and an aqueous solution containing a core material and an acid. This method simultaneously encapsulates a core material as a method for encapsulating by organic polymers but requires a large amount of a surfactant to reduce the size of capsules that then causes difficulty in removing the surfactant. Further, this method is not suitable for water-soluble core materials.

Silica used as a shell material in the present invention has excellent stability at high temperature as well as against chemicals, is optically transparent in visible range, and is widely used for fillers and additives for cosmetics. Particularly, silica is advantageous in that it can be processed into a wide variety of shapes by sol-gel method using silicon alkoxide or water glass as starting materials. In general, the sol-gel technology refers to solution-based processes that undergo hydrolysis and polymerization reactions to give gels. In the sol-gel process, basic catalyst is used to enhance the process of converting sols into networked gels in microencapsulation and thus it is necessary to remove the basic catalyst that causes environmental pollution after producing microcapsules. This process may cost extra labor and expense, and further, use of a basic catalyst may be limited by the treatment regulation.

Therefore, the use of inorganic silica in microencapsulation process not only reduces environmental pollution by minimizing the release of a basic gelling agent in the production of microcapsules through a sol-gel reaction but also enables it to be applied in encapsulation of both hydrophilic and lipophilic core materials.

SUMMARY OF THE INVENTION

Inventors have extensively studied to develop a process for preparing silica microcapsules wherein a minimal amount of a basic gelling agent is used while they are suitable for both hydrophilic and lipophilic core materials.

The present invention was completed by preparing a precursor composite to have a hydrophilic or lipophilic character, adding a core material and an appropriate amount of aminopropyltrialkoxysilane as a gelling agent therein, and emulsifying and dispersing into a solution having a polarity opposite to that of the core material and containing a small amount of a surfactant to encapsulate the core material with silica shell by a sol-gel reaction. The process of the present invention obviously reduces environmental pollution as compared to the conventional process that uses an ammonia solution as a basic gelling agent and is also suitable for both hydrophilic and lipophilic core materials.

Accordingly, an object of the present invention is to provide a process for preparing silica microcapsules by controlling a degree of hydrolysis with tetraethyl orthosilicate (TEOS), and adding an appropriate amount of aminopropyltrialkoxysilane as a gelling agent.

DETAILED DESCRIPTION OF THE INVENTION

Figure 1A:
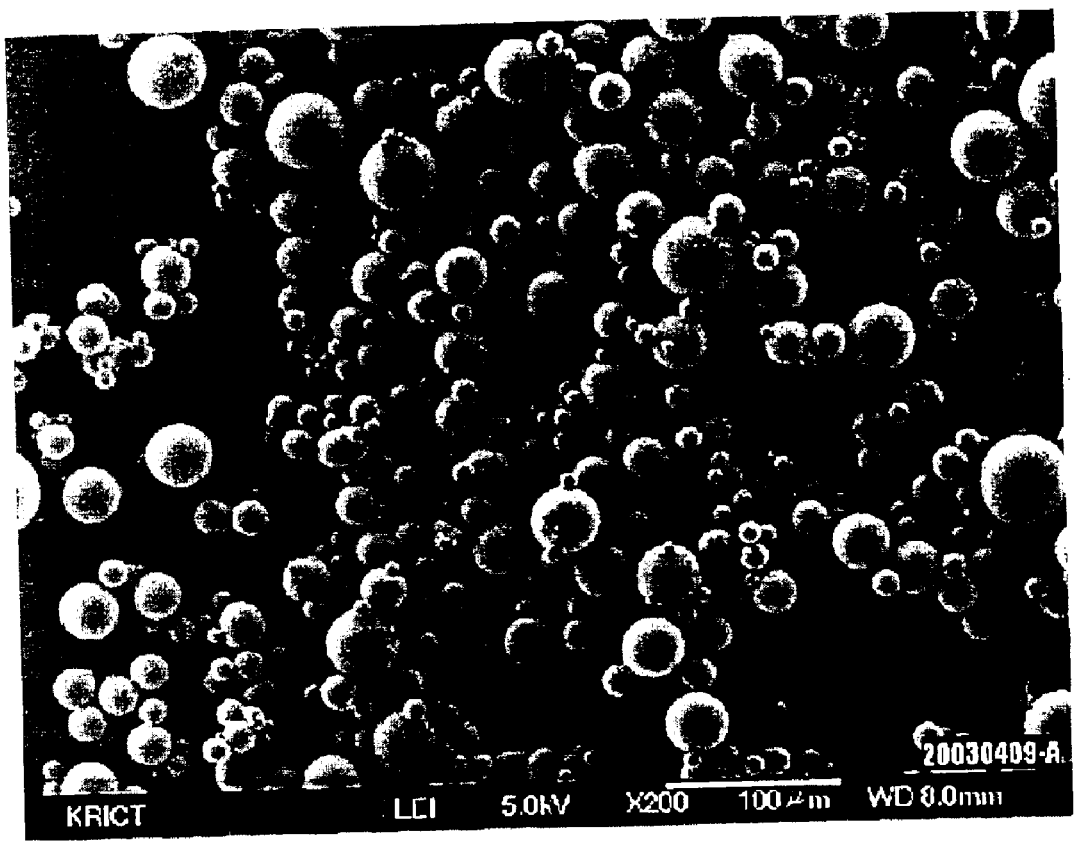
FIG. 1a is a scanning electron microscopy (SEM) photograph of silica microcapsules where ultraviolet absorber (octylmethoxycinnamate) as a core material is impregnated according to Example 1 of the present invention.

The present invention is to provide a process for preparing silica microcapsules comprising the steps of:

preparing a solution of formula (1) by dissolving tetraethyl orthosilicate (TEOS) into an aqueous solution containing a hydrolysis catalyst;

adding a core material and aminopropyltriepoxisilane in the above solution; and emulsifying and dispersing the resulting solution to a solution having a polarity opposite to that of the core material to provide a sol-gel reaction at the interfacial layer,

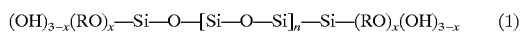

$$(OH)_{3-x}(RO)_x-Si-O-[Si-O-Si]_n-Si-(RO)_x(OH)_{3-x} \quad (1)$$

wherein R is a $C_1$–$C_{10}$ alkyl, x is 1, 2 or 3, and n is an integer number of 100–1,200.

The present invention is described in detail hereunder. The present invention describes an effective process for preparing silica microcapsules where a precursor solution of formula (1) is prepared to have hydrophilicity or lipophilicity by controlling the degree of hydrolysis and degree of polymerization of tetraethyl orthosilicate and an appropriate amount of aminopropyltrialkoxysilane is added to the above solution as a hydrophilic or lipophilic core material and a gelling agent without using any alkali gelling agent.

The precursor solution of formula (1) has a molecular weight of 1,000 to 9,000 to be mixed well with a hydrophilic or lipophilic core material by regulating a degree of hydrolysis and degree of polymerization.

The process for preparing silica microcapsules of the present invention comprises the steps of:

(1) a process for preparing a precursor solution of formula (1) having a particular molecular weight to be a hydrophilicity or lipophilicity by hydrolyzing tetraethyl orthosilicate into an aqueous solution containing a hydrolysis catalyst;

(2) a mixing process of a core material and aminopropyltrialkoxysilane into the precursor solution; and (3) an emulsifying and dispersing process of the mixture solution into a solution having a polarity opposite to that of the core material to perform a sol-gel reaction due to its own catalytic activity of aminopropyltrialkoxysilane to produce spherical silica microcapsules.

Tetraethyl orthosilicate is slowly added to a hydrolysis catalyst in an equivalence ratio of 0.3 to 3.0 to maintain a homogeneous solution. The mixture solution is stirred for 12 hours to have a molecular weight 1,000 to 9,000 through hydrolysis and polymerization. Alcohols such as ethanol produced as a byproduct are removed by evaporation under the pressure to produce the precursor solution of formula (1) having a clear viscosity. When tetraethoxy orthosilicate is added too fast, W/O type emulsion is produced and the desired precursor solution having a clear viscosity and appropriate particles may not be obtained. Further, if tetraethoxy orthosilicate is used less than 0.3 equivalence ratio, the precursor solution is gelatinized and cannot be mixed with the core material to produce the desired microcapsules. On the other hand, if it is used more than 3 equivalence ratio, it is difficult to obtain spherical capsules due to a slow gelling process.

A degree of hydrolysis and a degree of polymerization may be described as x and n in formula (1). For example, the precursor solution with high value of x that means low degree of hydrolysis mixes well with lipophilic core materials and one with low value of x does well with hydrophilic core materials. Thus, a small amount of surfactant is added in a solution having a polarity opposite to that of the core material to obtain emulsion and the solution may be slowly gelled to produce silica microcapsules due to aminopropyltrialkoxysilane already added in the core material. 5 to 30 parts by weight of a mixture of the precursor solution, a core material and aminopropyltrialkoxysilane is added with reference to that of the solution having an opposite polarity. When the amount is less than the desired range, required solvent amount may be increased. On the other hand, when it exceeds the range, the volume of produced capsules may be increased but the sphericity is deteriorated due to severe agglomeration. Therefore, it is preferable to use the core material in the range of from 5 to 50 parts by weight, with reference to that of the silica precursor solution, to impregnate into silica microcapsules.

In the selection of core materials to impregnate into the silica microcapsule, examples thereof include organic materials such as dyes, perfumes, medical drugs and the like, inorganic materials such as Ag, $TiO_2$ and the like dispersed into a medium and any materials having hydrophilic/lipophilic characteristics.

Aminopropyltrialkoxysilane is used as a gelling agent in the range of from 0.5 to 5 parts by weight, with reference to the total weight of the hydrolyzed and polymerized precursor solution and core material. If the amount is less than 0.5 parts by weight, the sphericity is deteriorated due to slow gelation and severe agglomerization. On the other hand, if it is more than 5 parts by weight, the gellation occurs before the emulsion process. Particularly, use of aminopropyltrialkoxysilane as a gelling agent in the present invention reduces environmental pollution compared to use of conventional alkalis as a gelling agent and provides easy selection of the core material without any limitation whether it is hydrophilic or lipophilic and organic or inorganic.

Organic dispersing agents such as polyvinyl alcohol, sodium dodecylsulfate and the like may be used, if necessary, when an aqueous solution is used as a solution having a polarity opposite to that of the core material. Amount used is in the range of from 0.1 to 1 parts by weight to minimize aggregation between silica microcapsule particles and control particle size.

The produced silica microcapsules are filtered, washed and dried at room temperature.

The present invention as described above may produce the silica microcapsules having core materials with various characteristics. Silica capsules provide porous shells unlike organic polymer capsules. When the core material is volatile or soluble in a solvent, it can be slowly released through porous capsule shells. Silica microcapsules containing organic core material can be prepared to microcapsules in the hollow part having a size of from several ten μm to several hundred μm at the central part by heat treatment. The microspheres prepared in the present invention can be various sizes of microspheres unlike conventional processes. They are, therefore, suitable for carriers for several materials, thermal insulation materials and soundproofing materials. Microcapsules containing inorganic core materials are dispersed into an organic or inorganic bonding agent so that they can be suitable for coating materials. As described above, the process for preparing microcapsules of the present invention can be widely adopted in industries.

Although this invention has been described in its preferred form with a certain degree of particularity, it is appreciated by those skilled in the art that the present disclosure of the preferred form has been made only by way of examples and that numerous changes in the details of the construction, combination, and arrangement of parts may be resorted to without departing from the spirit and scope of the invention.

EXAMPLE 1

Of tetraethoxy orthosilicate(TEOS) 1160 g, first 160 g was slowly added to 0.01M aqueous solution of HCl 100 g for 3 hours and the remaining 1000 g was added for 1 hour. The reaction mixture was stirred for 12 hours to obtain a clear solution. The clear solution was evaporated under the pressure at a temperature of 50° C. to remove ethanol produced as a byproduct during the reaction. The resulting solution was a clear viscous precursor solution for lipophilic core material of which viscosity was about 35 cp and molecular weight was 3,200 Mw determined using gel permeation chromatography (GPC). 20 parts by weight of octylmethoxycinnamate as a core material was dissolved in the lipophilic precursor solution. 1.0 part by weight of aminopropyltriepoxysilane(APS) as an inner gelling agent was added into the resulting solution to produce emulsion solution. While an aqueous solution containing 1.0 part by weight of a surfactant (Triton X-100) in a separate container was stirred at a rate of about 1000 rpm, 20 parts by weight of the emulsion solution prepared above compared to the aqueous solution was added therein to produce O/W emulsion. After the reaction mixture was reacted for 10 minutes and left for 2 hours, particles precipitated at the bottom were filtered, dried at room temperature and microcapsulated having a spherical size of 1 to 10 μm.

Figure 1B:
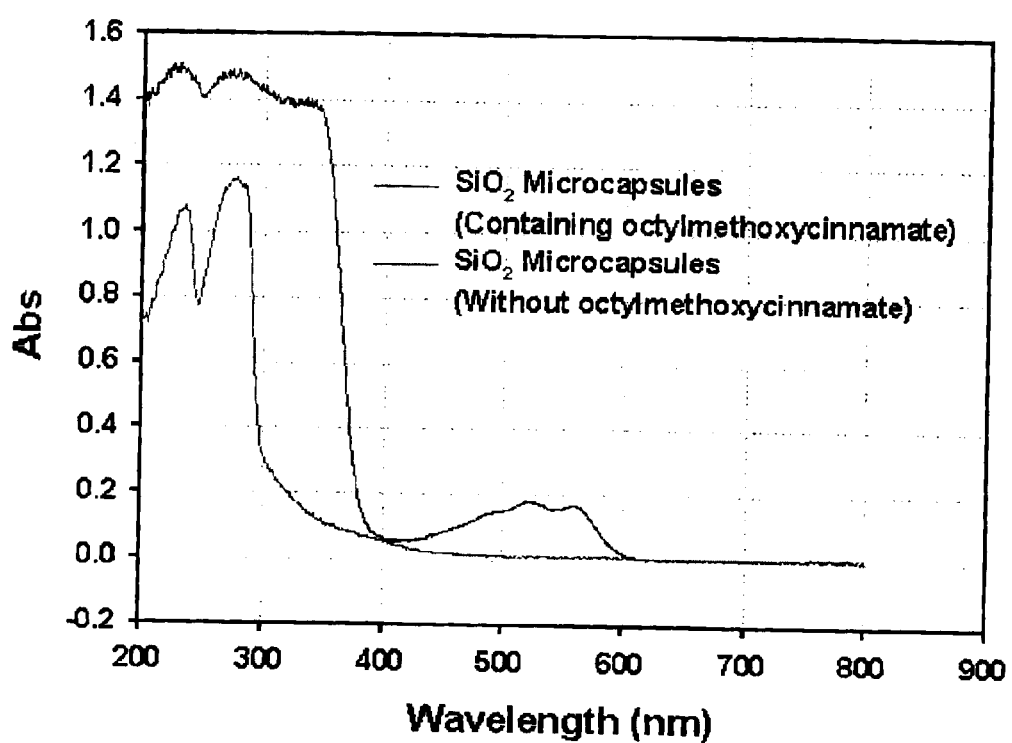
FIG. 1b is an UV/Vis absorption spectra of silica microcapsules where ultraviolet absorber (octylmethoxycinnamate) as a core material is impregnated according to Example 1 of the present invention.

FIG. 1a represents a scanning electron microscopy picture of the silica microcapsules prepared and FIG. 1b represents a UV/Vis absorption spectrum. As defined in FIG. 1a, the microcapsules prepared in the present invention are spherical microcapsules and the ultraviolet absorber provides excellent microcapsulation as shown in FIG. 1b.

EXAMPLE 2

Of tetraethoxy orthosilicate(TEOS) 7760 g, first 170 g was slowly added to 0.01M aqueous solution of HCl 100 g for 3 hours and the remaining 600 g was added for 1 hour. The reaction mixture was stirred for 12 hours to obtain a clear solution. The clear solution was evaporated under the pressure at a temperature of 50° C. to remove ethanol produced as a byproduct during the reaction. The resulting solution was a clear viscous precursor solution for hydrophilic core material of which viscosity was about 935 cp and molecular weight was 5,500 Mw determined using gel permeation chromatography (GPC). 20 parts by weight of 4-hydroxybenzophenone as a core material was dissolved in the hydrophilic precursor solution. 0.5 parts by weight of aminopropyltriepoxysilane(APS) as an inner gelling agent was added into the resulting solution to produce emulsion solution. While cyclohexene containing 1.5 parts by weight of a surfactant(Triton X-100) in a separate container was stirred at a rate of about 15,000 rpm, 10 parts by weight of the emulsion solution prepared above compared to the aqueous solution was added therein using a pump to produce W/O emulsion. After the reaction mixture was reacted by stirring with a mechanical stirrer at a rate of 1,000 rpm for 20 minutes and left for 2 hours, particles precipitated at the bottom were filtered, dried at room temperature and microcapsulated having a spherical size of 5 to 15 μm.

EXAMPLES 3–8 AND COMPARATIVE EXAMPLES 1–2

Microcapsules of Examples 3 to 8 and Comparative Examples 1 and 2, with TEOS/$H_2O$ ratio, kinds and amount of core materials, emulsion types (W/O or O/W), emulsion rate, amount of APS and capsule sizes as shown in Table 1, were prepared, by the same procedure in Example 1

TABLE 1

|  | TEOS/$H_2O$ molar ratio) | Precursor solution (viscosity/Mw) | Core material Amount (Parts by wt) | Emulsion type | Emulsifying rate (rpm) | Used APS (Parts by wt) | Capsules Capsule size (μm) |
|---|---|---|---|---|---|---|---|
| Ex. 3 | 2 | 1.2/1200 | Butyl methoxydibenoylmethane 15 | O/W | 20,000 | 0.5 | Encapsulation possible 1–5 |
| Ex. 4 | 0.6 | 120/8600 | 2-hydroxy-4-methoxy-bezopheneone 7 | W/O | 25,000 | 1.5 | Encapsulation possible 0.7–3 |
| Ex. 5 | 0.6 | 120/8600 | $TiO_2$ Powder 5 | W/O | 1,000 | 2.0 | Encapsulation possible 10–30 |

TABLE 1-continued

| | TEOS/ $H_2O$ molar ratio | Precursor solution (viscosity/ Mw) | Core material Amount (Parts by wt) | Emulsion type | Emulsi- fying rate (rpm) | Used APS (Parts by wt) | Capsules Capsule size ($\mu$m) |
|---|---|---|---|---|---|---|---|
| Ex. 6 | 1.0 | 32/3200 | Butyl methoxydi- benoylmethane 25 | O/W | 800 | 1.0 | Encapsu- lation possible 20–50 |
| Ex. 7 | 0.6 | 120/8600 | Risol rubine B 3 | W/O | 18,000 | 2.0 | Encapsu- lation possible 1–10 |
| Ex. 8 | 1.5 | 10/2500 | Liposoluble perfume 10 | O/W | 15,000 | 0.7 | Encapsu- lation possible 1–5 |
| Com Ex. 1 | 3.3 | 1.1/600 | Octylmethoxy- cinnamate | O/W | 10,000 | 1.0 | Encapsu- lation impossible |
| Com Ex. 2 | 1.0 | 32/3200 | Octylmethoxy- cinnamate | O/W | 15,000 | Aq. ammonia 1.0 | Encapsu- lation impossible |

As shown in Table 1, the microcapsules prepared in Examples 3 to 8 of the present invention were spherical while the formation of spherical microcapsules in comparative example 1, where the range was deviated from that of the present invention, was impossible due to a very slow emulsifying rate. Comparative example 2 is an example for preparing capsules employing conventional alkali gelling agent. When aqueous ammonia was used as a gelling agent to the precursor solution in the process for preparing microcapsules of the present invention, it was impossible to microcapsulate due to a gelling problem of a mixture solution. When the aqueous ammonia was injected to a solvent instead of employing as a gelling agent after a mixture solution for preparing capsules was emulsified in an aqueous solution like conventional emulsion sol-gel reaction, it was capable for forming capsules. Use of aqueous ammonia, however, discharges a large amount of nitrogen in the waste water which is a eutrophication material having a pH of 12 or above, while the waste water produced with use of a gelling agent has a pH of 8 to 9.

According to the present invention, the process for preparing silica microcapsules can control the degree of hydrolysis and molecular weight by adding tetraethoxy orthosilicate in an appropriate amount into an aqueous solution containing a hydrolytic catalyst and thus, being capable efficiently for preparing microcapsules containing either hydrophilic or lipophilic core material. Further, the process of the present invention minimizes environmental pollution, a wastewater treatment process, and poor work conditions associated with the aqueous ammonia solution used in the conventional processes by employing a particular amount of aminopropyltriepoxysilane in a mixture of the core material and precursor solution as a gelling agent. The microcapsules of the present invention are uniformed with rapid gellation for pre-mixed gelling agent and are easily controlled to have an average particle size of 0.5 to 50 $\mu$m.

Therefore, the process for preparing silica microcapsules of the present invention is simple, resolves environmental pollution associated with use of a large amount of an alkali solution and is suitable both hydrophilic and lipophilic core materials.

The microcapsules prepared according to the present invention have combined functions of core material and shell material by controlling a degree of polymerization of the precursor solution, hybridizing organic materials, regulating releasing rate of the core material, and providing flexibility.

The capsulation with inorganic or organic-inorganic hybrid core material impregnates organic materials noxious with direct contacts or unstable with environmental conditions into chemically stable inorganic materials and thus, provides stability and functionality toward human beings. Further, the microcapsules prepared in the present invention are spherical porous silica capsules to improve the dispersion and packing factor. The silica microcapsules of the present invention, therefore, are suitable for cosmetic materials, various kinds of polymers, coloring agents of paper and paint, fillers, additives and the like. The silica microcapsules are also suitable for functional materials such as pharmaceuticals, long-lasting perfume and biosenses by gradually releasing impregnated organic materials or improving reactivity.

What is claimed is:

1. A process for preparing silica microcapsules comprising the steps of:

preparing a precursor solution containing a compound of formula (1) by adding tetraethyl orthosilicate in an aqueous solution containing a hydrolysis catalyst;

adding a core material and aminopropyltriepoxysilane into the precursor solution; and emulsifying and dispersing the resulting solution into a solution having a polarity opposite to that of the core material to perform a sol-gel reaction at the interface thus impregnating the core material, $$(OH)_{3-x}(RO)_x-Si-O-[Si-O-Si]_n-Si-(RO)_x(OH)_{3-x} \quad (1)$$

wherein R is a $C_1$ to $C_{10}$ alkyl group, x is 1, 2 or 3, and n is an integer of 100 to 1,200.

2. The process for preparing silica microcapsules according to claim 1, wherein said tetraethyl orthosilicate is used in the range of from 0.3 to 3.0 equivalence ratio with reference to that of the hydrolysis catalyst.

3. The process for preparing silica microcapsules according to claim 1, wherein said core material is selected from the group consisting of lipophilic or hydrophilic organic materials, and inorganic materials.

4. A process for preparing silica microspheres having a hollow inside by the heat treatment of the silica microcapsules where the organic material prepared according to claim 1 is impregnated.

5. A coating agent containing the silica microcapsules prepared according to claim 1.

6. Silica microcapsules for UV protection material wherein an organic UV absorbing agent or a UV insulating agent is impregnated as a core material, prepared according to claim 1.

* * * * *